Patented July 7, 1936

2,046,452

UNITED STATES PATENT OFFICE 2,046,452

AZO-DYESTUFFS INSENSIBLE IN THE DYEBATH TOWARDS HARD WATER

Joseph Gyr and Otto Kaiser, Basel, Switzerland, assignors to firm Society of Chemical Industry in Basle, Basel, Switzerland No Drawing. Original application December 10, 1932, Serial No. 646,707. Divided and this application December 1, 1934, Serial No. 755,634. In Switzerland December 17, 1931

2 Claims. (Cl. 260—27)

This is a division of our application for patent Serial No. 646,707 filed in the U. S. A. on December 10, 1932, and in Switzerland on December 17, 1931.

In U. S. Patent No. 1,667,312, Example 14, there is described a direct dyeing green polyazo-dyestuff, which can be made by the action of the diazotized azo-dyestuff from 1-diazo-8-hydroxynaphthalene-3,6-disulfonic acid and cresidine on 1 mol. of the ternary condensation product from 1 mol. cyanuric chloride, 1 mol. 1-amino-8-hydroxynaphthalene-3,6-disulfonic acid, 1 mol. 4'-amino-4-hydroxyazobenzene - 3 - carboxylic acid and 1 mol. aniline. This dyestuff is characterized by the beauty and the outstanding fastness to light of the dyeings on cotton which can be obtained by its use. It has, however, the disadvantage that it is sensitive to calcium carbonate, so that when hard water is used in the dyeing operation enfeebled dyeings may easily be produced.

The present invention relates to green direct dyeing azo-dyestuffs fast to light which, on the one hand, are insensible in the dye-bath towards hard water, and on the other part, correspond to the general formula

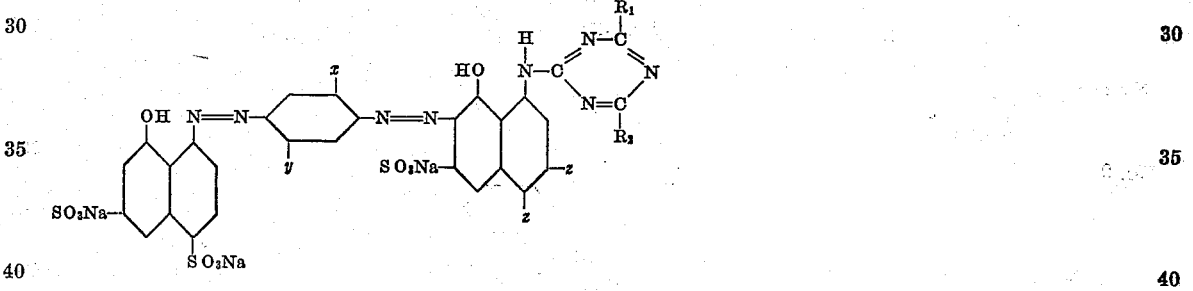

in which one $z$ represents an $SO_3Na$-group and the other $z$ a hydrogen atom, $y$ and $x$ alkyl or alkoxy, $R_1$ the radical of ammonia or of an amino compound and $R_2$ the radical of a yellow aminoazo-dyestuff.

Such dyestuffs are obtained when, in known manner and in suitable sequence, 1 mol. of a diazotized azo-dyestuff from 1-diazo-8-hydroxynaphthalene-4,6-disulfonic acid (if desired in the form of an O-acyl ester) and a middle component of the general formula

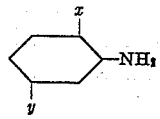

(in which $y$ and $x$ represent alkyl or alkoxy), 1 mol. 1-amino-8-hydroxynaphthalene-3,6- or 4,6-disulfonic acid, 1 mol. cyanuric chloride, 1 mol. of a yellow aminoazo-dyestuff and 1 mol. ammonia or 1 mol. of any amino-compound are caused to react with each other, and, if desired, the product thus obtained is treated with a saponifying agent.

The following example illustrates the invention the parts being by weight:—

Example 621 parts of the dyestuff obtainable by coupling 1 mol. diazotized 1-amino-8-hydroxynaphthalene-4'-toluenesulfonic acid-ester-4,6-disulfonic acid and 1 mol. 3-amino-4-cresolmethylether are diazotized and the product is introduced into a cooled ammoniacal solution or solution containing pyridine of 744 parts of the ternary condensation product from 1 mol. cyanuric chloride, 1 mol. 1-amino-8-hydroxynaphthalene - 3,6 - disulfonic acid, 1 mol. 4-amino-4'-hydroxyazobenzene-3'-carboxylic acid and 1 mol. aniline. When coupling is complete, the whole is heated to 85° C. and at this temperature the toluene sulfonic acid residue is split off by addition of caustic soda solution. The dyestuff is worked up in the usual manner. It dyes cotton in bath made with either soft water or hard water full green tints. The new dyestuff in the form of its sodium salt corresponds very probably with the formula

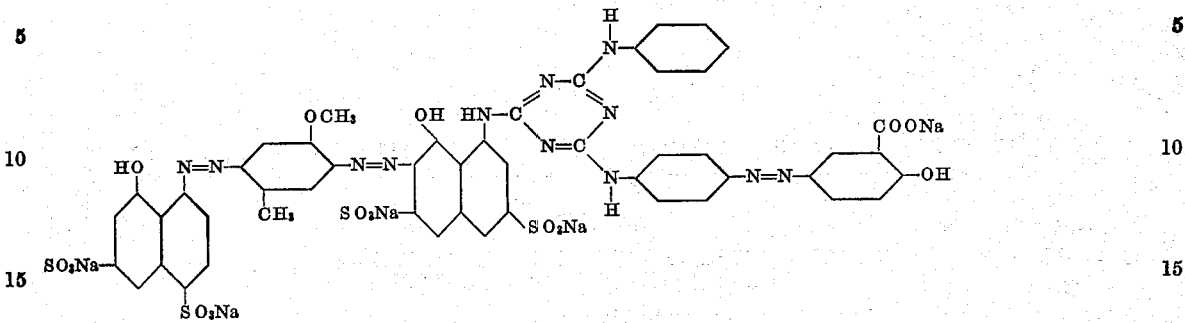

The following table gives a number of further examples of dyestuffs obtainable in accordance with the invention and their properties:

| | | Initial component | Middle component | Condensation product of 1 mol. cyanuric chloride with 1 mol. each of— | | |
|---|---|---|---|---|---|---|
| (1) | | 1 - amino - 8 - hydroxynaphthalene - 4,6 - disulfonic acid. | 1 - methyl - 3 - amino - 4 - methoxybenzene | 1 - amino - 8 - hydroxynaphthalene 3,6 - disulfonic acid | 4 - amino - 4' - hydroxyazo - benzene - 3' - carboxylic acid | Aniline - 4 - sulfonic acid |
| (2) | | Do | do | do | do | Monomethylamine |
| (3) | | Do | do | do | do | Diethylamine |
| (4) | | Do | do | do | do | Monoethylaniline |
| (5) | | Do | do | do | do | 4,4' - diamino - diphenyl- 2,2'-disulfonic acid |
| (6) | | Do | do | do | do | 4 - chloroaniline - 3 - sulfonic acid |
| (7) | | Do | do | do | do | 3 - amino - benzoic acid |
| (8) | | Do | do | do | 4 - amino - 3 - methoxyazo - benzene - 3' - sulfonic acid | Aniline |
| (9) | | Do | do | do | do | 1 - naphthylamine |
| (10) | | Do | do | 1 - amino - 8 - hydroxynaphthalene - 4,6 - disulfonic acid. | 4 - amino - 4' - hydroxyazo - benzene - 3' - carboxylic acid | 2 - naphthyl-amine |
| (11) | | Do | 1,4 - dimethyl - 2 - aminobenzene | 1 - amino - 8 - hydroxynaphthalene - 3,6 - disulfonic acid | do | Aniline |
| (12) | | Do | 1, 4 - dimethoxy - 2 - aminobenzene. | do | do | Monomethylamine |

The formulas of some of the dyestuffs of the above table are as follows:—

No. 3

No. 9

No. 11

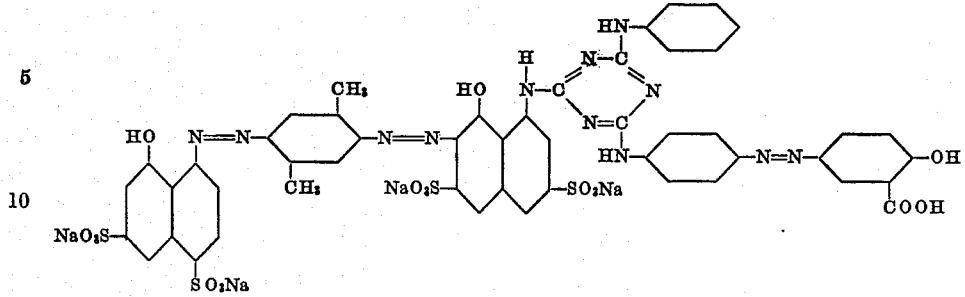

No. 12

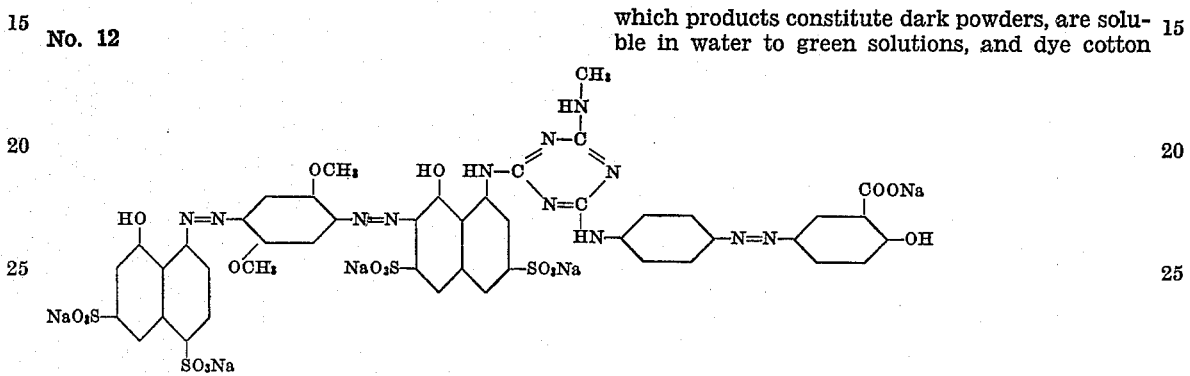

What we claim is:—

1. The green direct dyeing azo-dyestuffs fast to light which are insensible in the dyebath towards hard water and correspond to the general formula

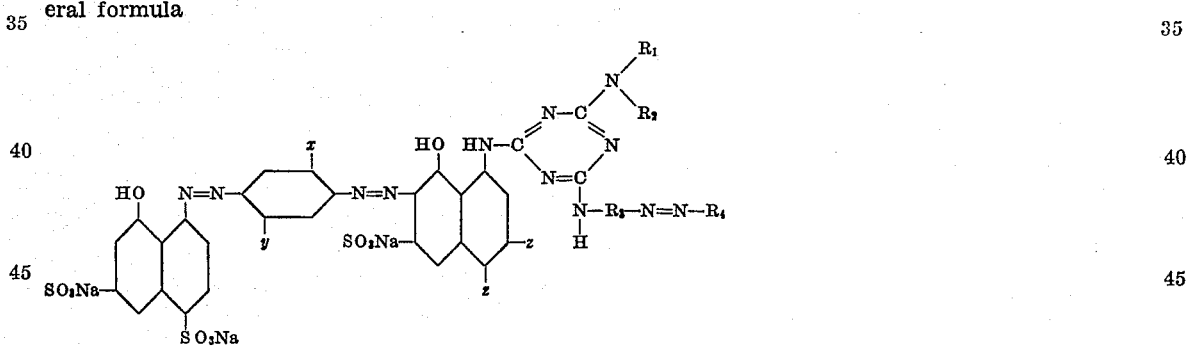

in which one $z$ represents an $SO_3Na$-group and the other $z$ represents a hydrogen atom, $y$ and $x$ represent a substituent selected from the group consisting of alkyl and alkoxy, $R_1$ stands for a member of the class consisting of hydrogen and alkyl, $R_2$ stands for a member of the class consisting of hydrogen, alkyl and aryl radicals of the benzene or naphthalene series, and $R_3$ and $R_4$ stand for radicals of the benzene series, which products constitute dark powders, are soluble in water to green solutions, and dye cotton or regenerated cellulose in green tints which are fast to light.

2. The green, direct dyeing azo-dyestuff fast to light which is insensible in the dyebath towards hard water and corresponds to the formula

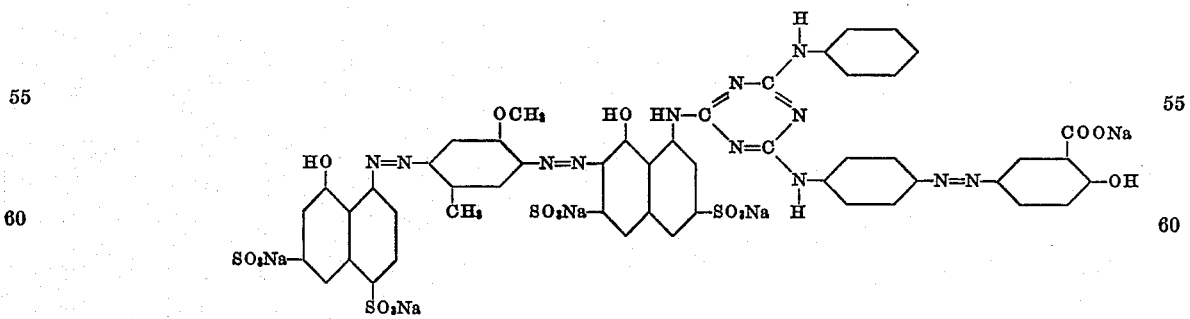

which product constitutes a dark powder, is soluble in water to a green solution, and dyes cotton or regenerated cellulose green tints which are fast to light.

JOSEPH GYR.
OTTO KAISER.